United States Patent [19]
Morgan et al.

[11] Patent Number: 5,821,940
[45] Date of Patent: Oct. 13, 1998

[54] COMPUTER GRAPHICS VERTEX INDEX CACHE SYSTEM FOR POLYGONS

[75] Inventors: Craig R. Morgan, Lakeside; Steven Scott Reed, San Diego, both of Calif.

[73] Assignee: Ball Corporation, Muncie, Ind.

[21] Appl. No.: 923,668

[22] Filed: Aug. 3, 1992

[51] Int. Cl.[6] .................................................. G06T 15/00
[52] U.S. Cl. ........................................ 345/420; 345/427
[58] Field of Search .................................. 395/119, 121, 395/127, 135, 120, 126, 123; 345/419, 420, 423, 427

[56] References Cited

U.S. PATENT DOCUMENTS

| | | | |
|---|---|---|---|
| 4,491,836 | 1/1985 | Collmeyer et al. | 340/747 |
| 4,653,012 | 3/1987 | Duffy et al. | 364/518 |
| 4,695,943 | 9/1987 | Keeley et al. | 364/200 |
| 4,710,876 | 12/1987 | Cline et al. | 364/414 |
| 4,768,148 | 8/1988 | Keeley et al. | 364/200 |
| 4,785,395 | 11/1988 | Keeley | 364/200 |
| 4,790,025 | 12/1988 | Inoue et al. | 382/41 |
| 4,812,988 | 3/1989 | Duthuit et al. | 364/522 |
| 4,829,452 | 5/1989 | Kang et al. | 364/518 |
| 4,833,601 | 5/1989 | Barlow et al. | 364/200 |
| 4,866,637 | 9/1989 | Gonzalez-Lopez et al. | 395/126 |
| 4,965,751 | 10/1990 | Thayer et al. | 364/521 |
| 4,975,977 | 12/1990 | Kurosu et al. | 382/46 |
| 5,056,044 | 10/1991 | Frederickson et al. | 364/521 |
| 5,086,495 | 2/1992 | Gray et al. | 395/120 |
| 5,163,126 | 11/1992 | Einkauf et al. | 395/123 |
| 5,179,638 | 1/1993 | Dawson et al. | 395/125 |

OTHER PUBLICATIONS

Foley et al, "Computer Graphics . . . ", 1990, pp. 213–222.
J.R. Woodwark, *Generating Wireframes from Set-Theoretic Solid Models by Spatial Division*, Jul./Aug. 1986, Computer Aided Design, vol. 18, No. 6, pp. 307–315.
Foley van Dam, Feiner, and Hughes, *Computer Graphics: Principles and Practice*, Second Edition, 1990, pp. 471–477, 870–873, 920–921, and 1166–1167.
"Processors for 3–D graphics; PC–based three–dimensional graphics," Margery S. Conner, EDN (c) 1989 Information Access Company, Cahners Publishing Company (Mar. 30, 1989) vol. 34; No. 7; p. 96 (Available on LEXIS®).

*Primary Examiner*—Mark K. Zimmerman
*Attorney, Agent, or Firm*—David H. Badger, Esq.

[57] ABSTRACT

The performance of a computer system displaying polygonal forms is improved by method and apparatus including a cache storage device and related control hardware operating in conjunction with a pipeline graphics display system to reduce or eliminate the redundant matrix transformation of shared vertex data, thereby reducing the processing time required to generate the graphics images displayed for out-the-window simulation.

22 Claims, 5 Drawing Sheets

COMPUTER GRAPHICS VERTEX INDEX CACHE SYSTEM FOR POLYGONS

BACKGROUND OF THE INVENTION

The invention generally relates to apparatus and methods for collecting and processing computer graphics polygonal vertex data for use in high-speed graphics displays. More particularly, the invention provides increased computer display system performance by reducing the number of redundant calculations required in generating display data for out-the-window simulation.

Out-the-window simulation involves the creation of life-like images on a computer graphics display to enhance the interaction between the operator and the computer system. For example, out-the-window simulation is presently used in flight training simulators to create and surround the pilot with the sensation of actual flight. The displayed images generally consist of a multitude of two-dimensional and three-dimensional polygonal forms generated by the computer graphics system. To effectively perform out-the-window simulation, the graphics system must be able to rotate or tilt the displayed polygonal forms. These manipulations require the system to perform matrix transformations to convert vertex data into world space values, including world coordinates (i.e., dimensionless cartesian coordinates) associated with the correct viewing angle, or perspective. By selecting the proper matrix coefficients, polygonal vectors can be scaled and perspectively rotated or tilted as desired. Typical prior art systems stored, and subsequently retrieved and transformed all of the vertex coordinates of each polygon prior to generating the graphics image by a graphics display.

FIG. 1 shows a diagrammatic representation of such a typical prior art system for processing vertex data for the purpose of generating polygonal forms on a graphics display. System 10 consists of a pipeline buffered architecture including a CPU 12, a display list device 14, a display list controller 16, a transformation processor 18 and display means 20 which includes a backend processor 24. CPU 12 calculates and sends vertices coordinates to a display list device 14 which stores the vertices data to be transformed. A display controller 16 sequentially retrieves the vertices data from display list device 14 as needed by system 10 and sends the individual vertex data to a transformation processor 18. Transformation processor 18 performs matrix transformations on the received polygonal vertex data to convert the polygonal vertex coordinates into world space coordinates. Transformation processor 18 then sends the transformed vertex data to the backend processor 24. Backend processor 24 then performs scan line conversion and pixel rendering to create the graphics image displayed by display means 20. In the typical prior art system, each vertex must be transformed regardless of whether a vertex is shared by one or more polygons. Thus, when polygons share a vertex, the system performs redundant transformation calculations which wastes precious computer time and slows the process of updating the graphics image displayed.

The time required to perform a matrix transformation can be significant when the displayed image includes a plurality of polygonal forms having a multitude of vertices coordinates and it is desired to rotate or tilt the image displayed. For example, a typical single matrix transformation of vertex coordinates using a 4×4 matrix transformation process requires 28 floating point operations: 16 multiplications and 12 additions. Each incremental change in the position of the image displayed requires each vertex of the displayed image to be transformed to provide an updated viewing perspective of the image. The time required to transform a complex image can be substantial. Therefore, it is desired to reduce the time required to update the display by reducing or eliminating redundant vertices transformations.

Past designs have attempted to reduce redundant transformations by using "mesh" polygonal data. As defined in Foley Van Damme, Feiner, and Hughes; *Computer Graphics Principles and Practice; Addison-Wesley Publishing Co., Inc.,* 1990, a polygon mesh is a set of connected polygon surfaces representing three-dimensional volumes. A polygon mesh can be represented by either explicit polygons or lists of pointers to vertices or edges. When represented as explicit polygons, the "mesh" contains duplicate information in the form of vertices or edges which require comparisons for the reduction of data redundancy. When represented as a list, the mesh system uses an indirect reference mechanism for locating vertex components and usually require sorting to find adjacent edges. In simulation, these extra processing requirements are too time consuming and preclude the use of mesh. Therefore, a more efficient means of eliminating redundant transformations is desired.

SUMMARY OF THE INVENTION

The present invention provides apparatus and method for improving the performance of a computer graphics system displaying polygonal forms. A processing device generates vertex data associated with a polygon, assigns an index value to a subsequent shared vertex, and stores the vertex data and the index value in a first memory device. A display list control unit sequentially retrieves the vertex data and the index values from the first memory device. A transformation unit converts the vertex data into world space data. A cache storage unit stores the world space data in a second memory device, preferably a cache memory device, and retrieves the world space data from the second memory device each time an index value stored in the first memory device is retrieved by the display list control unit. The cache storage unit then transfers the world space data to a display device.

In one preferred embodiment, the cache storage unit includes a cache memory device, a cache control device, and a buffer device. The world space data are stored in the cache memory device. The cache control device is coupled to the cache memory device. Each time the display list control unit retrieves an index value, the cache control device retrieves the corresponding world space data stored in the cache memory device and transfers the world space data to an internal bus. A buffer device receives the world space coordinates from the internal bus and transfers the world space data to a display device.

In another preferred embodiment, the cache control device above includes an index device for receiving the index value from the first memory device and for supplying the index value to an address port of the cache memory device. The cache control device also includes a control block for controlling the index device, the cache memory device, and the buffer device.

Other features and advantages of the invention may be determined from the drawings and detailed description of the invention that follows.

DETAILED DESCRIPTION OF PREFERRED EMBODIMENTS

Figure 1:
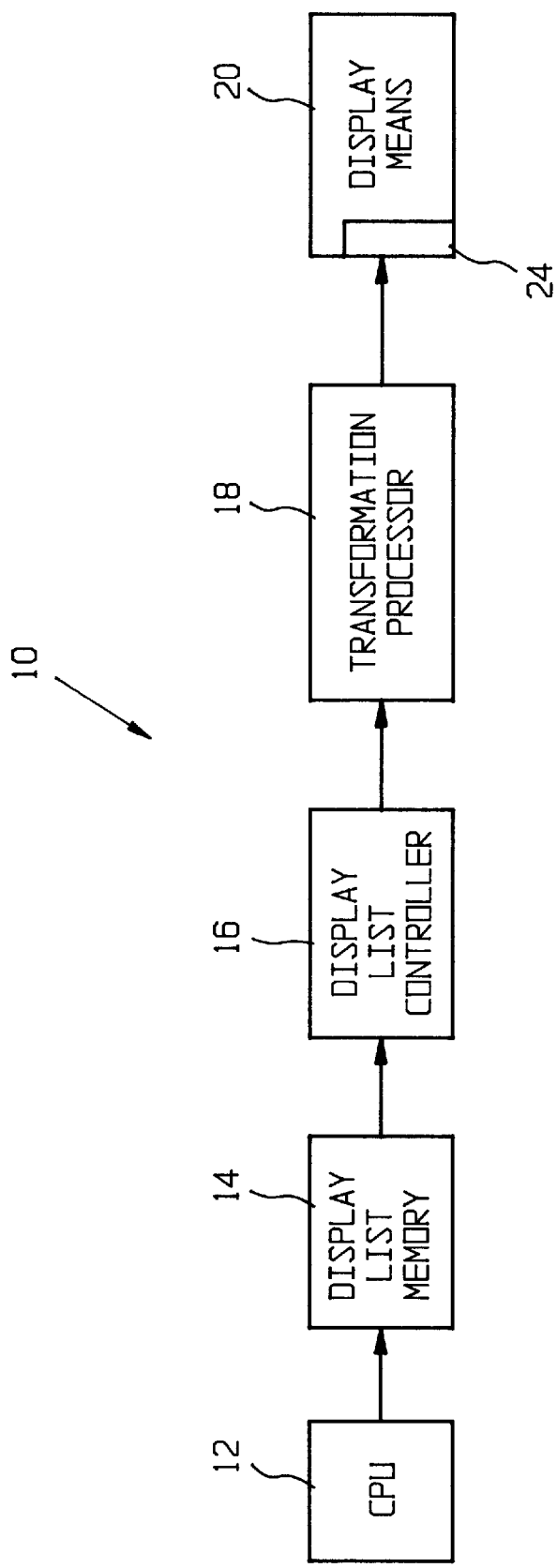
FIG. 1 shows a diagrammatic representation of a typical prior art system for processing vertex data.
Figure 2:
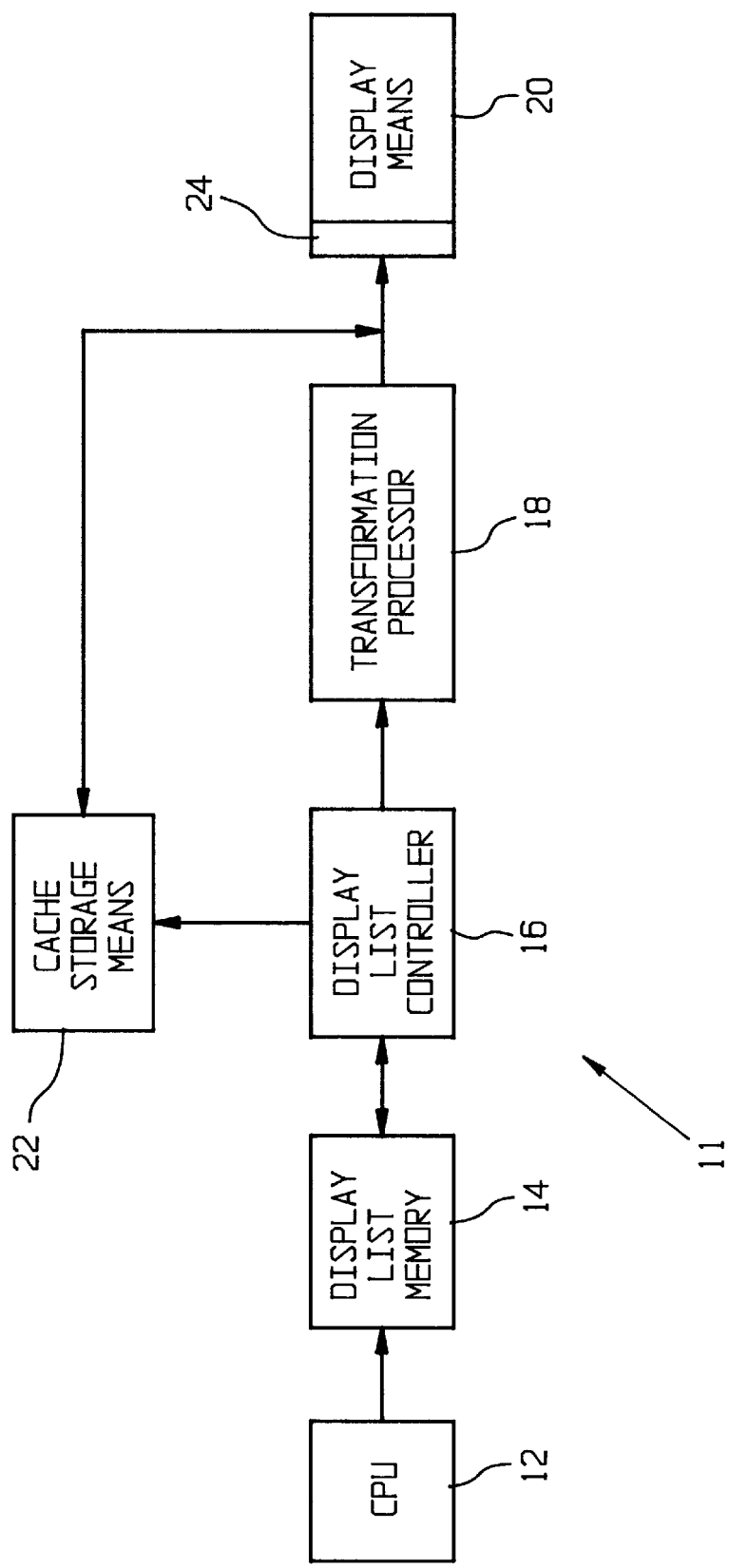
FIG. 2 shows a diagrammatic representation of a polygonal vertex system embodying the present invention.

FIG. 2 shows a vertex processing system 11 incorporating the present invention. A computer processing unit (CPU) 12 generates polygonal vertex data for the first, or original, occurrence of the vertices of each polygonal shape and index values to identify any shared vertices of a plurality of polygonal forms and stores the generated vertex data and index values in a display list memory 14. A display list controller 16 sequentially accesses the contents of each memory location in display list memory 14 and transfers the retrieved data to a transformation processor 18. Transformation processor 18 performs a matrix transformation on the selected vertex data to convert the vertex data into world space data, including world space coordinates, and sends the transformed coordinates to a backend processor 24 of a display device 20. Simultaneously, the world space coordinates for each original vertex are stored in a cache storage means 22 for future reference. Display list controller 16 continues to sequentially retrieve the contents of display list memory 14 and process the data as described above. However, when the display list controller 16 retrieves an index value (rather than original vertex data) from display list memory 14, display list controller 16 uses the index value to address the previously transformed coordinates of the shared vertex which are stored in cache storage means 22. Cache storage means 22 then supplies the previously transformed values to the display means 20 without the necessity of performing redundant matrix transformation of the vertex data by transformation processor 18, thereby reducing the time required to generate and update the graphics image displayed.

Figure 3:
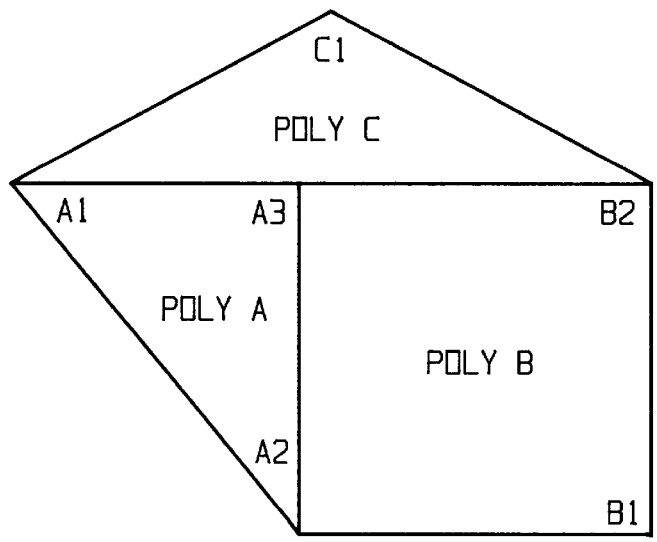
FIG. 3 shows exemplary polygonal forms to be displayed by a system of the invention.
Figure 4:
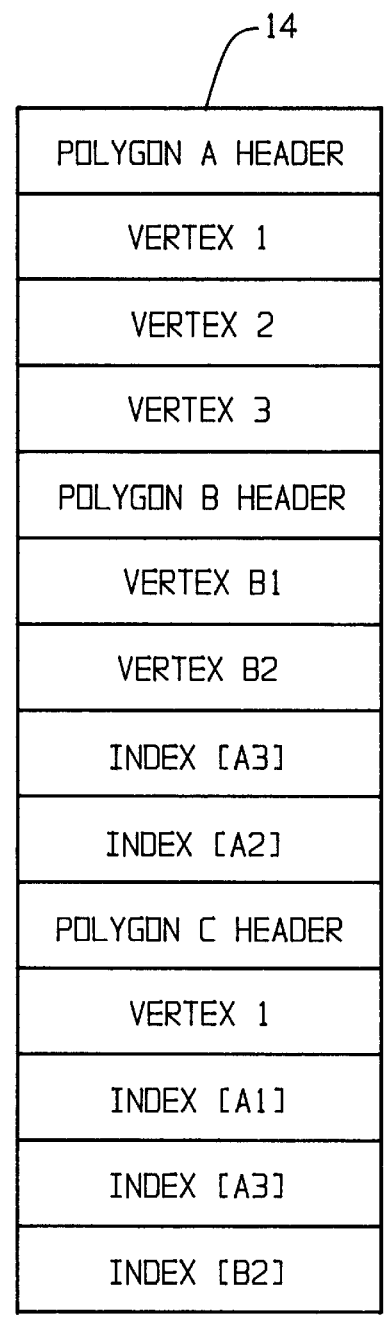
FIG. 4 shows a diagrammatic representation of the polygon display list in memory containing vertex data.

For example, FIG. 3 shows exemplary polygonal forms A, B, and C which are to be displayed by the graphics system. Vertices data relating to polygon A are labelled A1, A2, and A3. Polygon B includes original vertices B1 and B2, and shares vertices A2 and A3 with polygon A. Polygon C includes an original vertex C1 and shares vertex A1 with polygon A and shares vertex B2 with polygon B. As shown in FIG. 4, these vertices datum are sequentially stored in a portion of system memory designated as display list memory 14. The polygonal information for each polygon so stored includes a polygon header which identifies the polygon to which the subsequent vertices data correspond. For example, the polygonal information corresponding to polygon B begins with a polygon B header followed by original vertices B1 and B2, which are then followed by index values corresponding to the vertices A3 and A2, respectively, shared with polygon A. Each polygonal vertex is represented by X, Y, and Z vertex coordinates which are stored in display list device 14 in a floating point format. Each index value is stored in display list memory 14 in a binary format.

Figure 5:
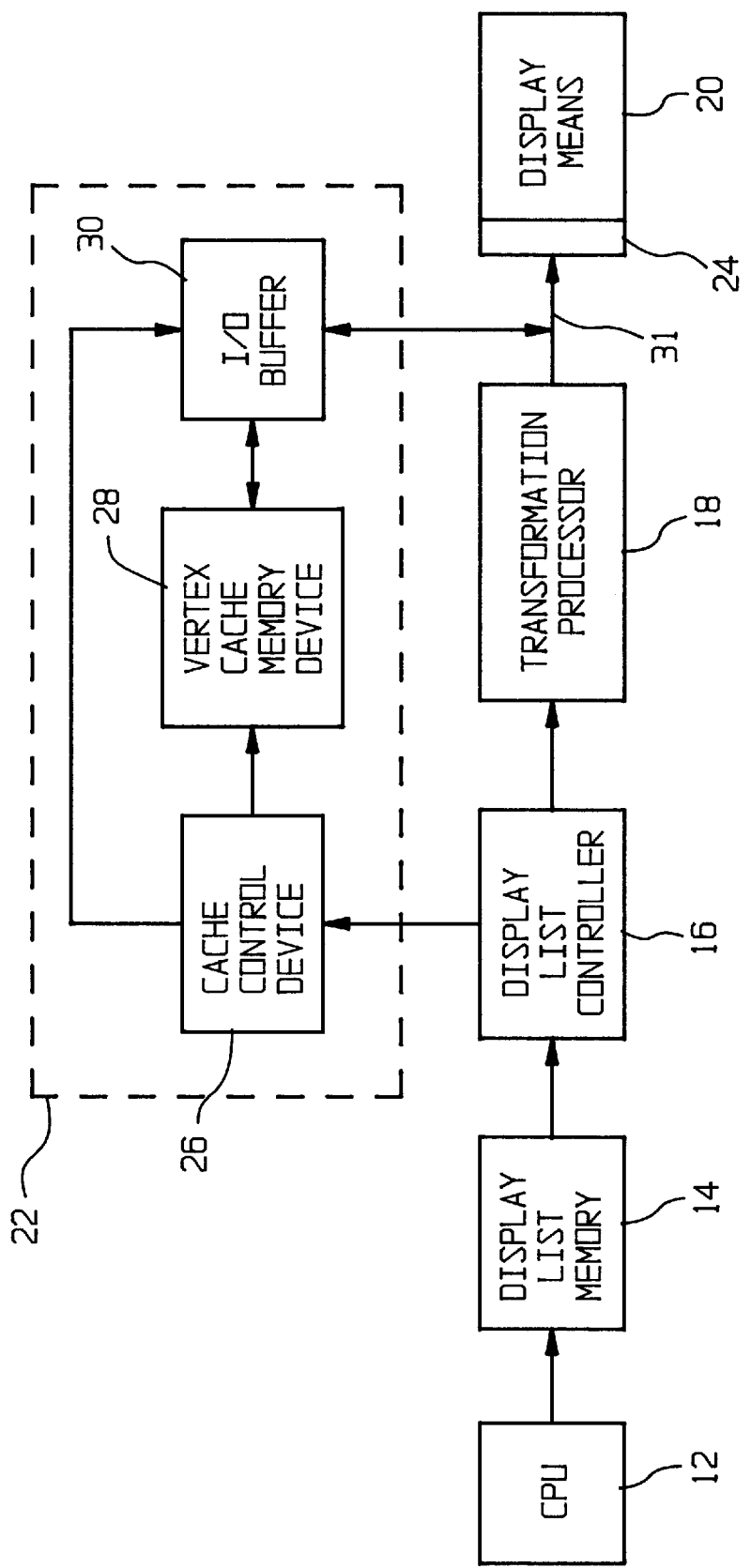
FIG. 5 shows a more detailed diagrammatic representation of the cache storage means of the invention.

FIG. 5 shows a more detailed diagrammatic representation of a system of the invention. A CPU 12 supplies and stores polygonal vertices data, such as the data shown in FIG. 4, in a display list memory 14 as shown in FIG. 5. Display list controller 16 sequentially retrieves the original vertex data from display list memory 14 and sends this vertex data to transformation processor 18 for matrix transformation of the vertex coordinates into world space coordinates. The transformation processor 18 then supplies the world space coordinates to a backend processor 24 of the display means 20. Backend processor 24 then provides clip testing, perspective divide and mapping to convert the world space coordinates into screen coordinates. Simultaneously, display list controller 16 supplies a signal to cache storage device 22. Cache storage device 22 includes a cache control device 26, a vertex cache memory device 28, and a cache Input/Output (I/O) buffer 30. Control device 26 activates an input port of I/O buffer 30 which latches the newly transformed world space coordinates. Cache control device 26 then executes an instruction which stores the world space values present at the input port of I/O buffer 30 in vertex cache memory device 28.

The system continues to sequentially retrieve the original vertex data from display list memory 14, transform the vertex data into world space coordinates in transformation processor 18, store the world space coordinates in vertex cache memory device 28, and send the world space coordinates to backend processor 24 in the manner described above until display controller 16 sequences to a display list memory location containing an index value of a shared vertex, such as Index [A3] of polygon B as shown in FIG. 4. Upon retrieving the A3 index value, display list controller 16 shown in FIG. 5 sends the A3 index value to cache control device 26 which then addresses the cache memory location containing the world space coordinates corresponding to the previously transformed coordinates of original vertex A3 of polygon A. Cache control device 26 then executes a retrieve instruction causing the indexed world space data corresponding to vertex A3 to be loaded in an output port of cache I/O buffer 30. Cache control device 26 then sends a signal to cache I/O buffer 30 to place the A3 world space data on the system bus 31 to send the A3 world space coordinates to backend processor 24, which in turn performs clip testing, perspective divide, mapping, scan line conversion and pixel rendering for generating a graphics image on display device 20. Thereafter, display controller 16 sequences to the next display list memory location and repeats the process described above.

Figure 6:
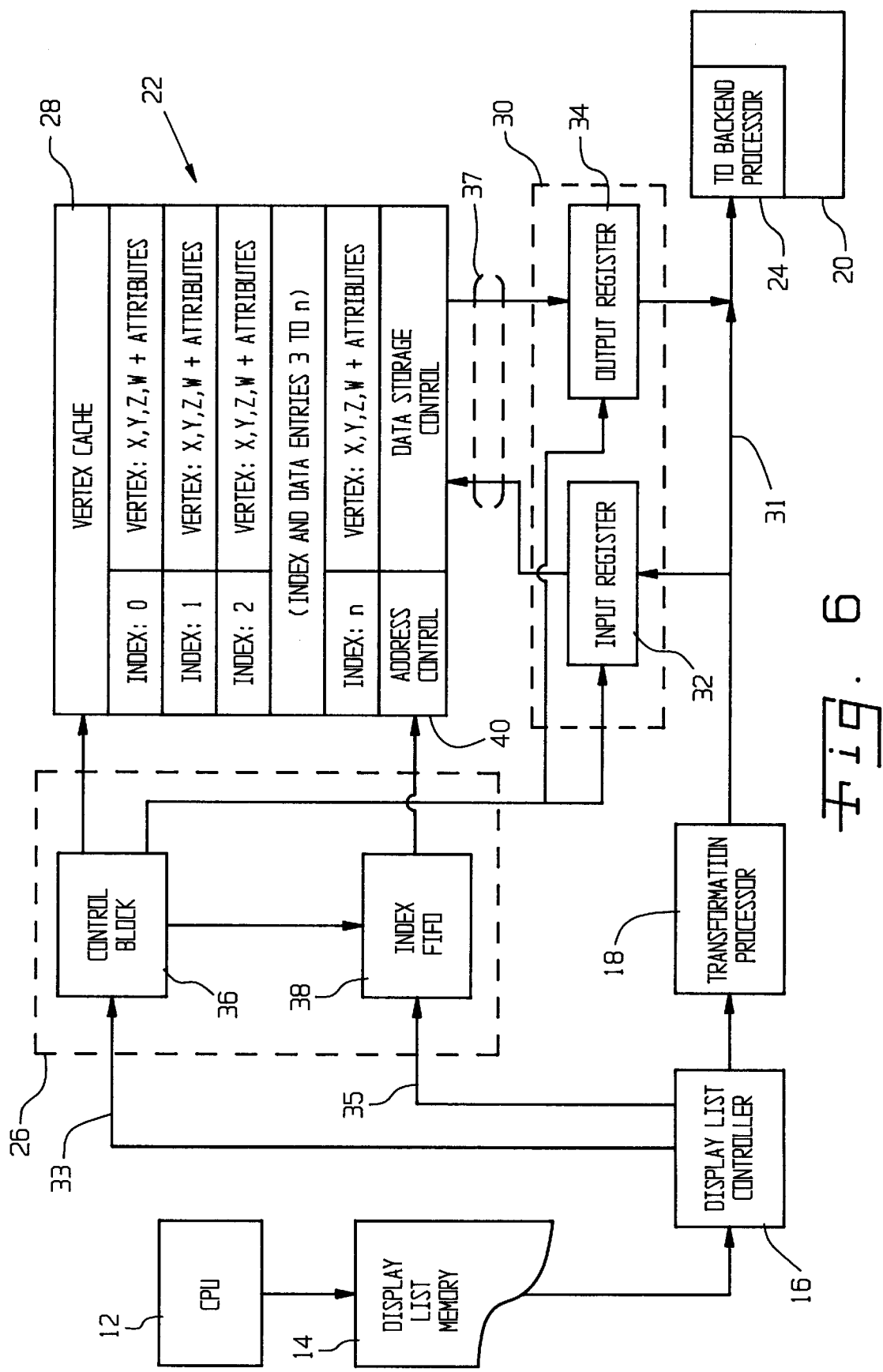
FIG. 6 shows a detailed diagrammatic representation of a polygonal vertex processing system embodying the present invention.

FIG. 6 shows a still more detailed diagrammatic representation of a preferred embodiment of the present invention. It is assumed that a CPU 12 has previously ordered and stored polygonal vertex data in a display list memory. Display list controller 16 sequentially retrieves the polygonal vertex data from display list memory 14 and sends the retrieved data to a transformation processor 18 for matrix transformation into world space data, such as world space coordinates. Transformation processor 18 then sends the newly transformed world space coordinates via a system bus 31 to a backend processor 24 of a graphics display device 20. Simultaneously, transformation processor 18 supplies the world space coordinates to an input register 32 of I/O buffer 30. I/O buffer 30 includes both an input register 32 and an output register 34. Display list controller 16 then sends a control signal over bus 33 to a control block 36 which in turn sends a signal to input register 32 to cause input register 32 to latch the newly transformed data. Control block 36 then sends a signal to vertex cache memory device 28 to cause vertex cache memory device 28 to store the contents of input register 32. Preferably, vertex cache memory device 28 is capable of storing transformed vertices data for 500 polygons.

The system of FIG. 6 continues to sequentially retrieve vertex data from display list memory 14, transform the data in transformation processor 18 into world space values, store the values in cache memory 28, and send the transformed values to backend processor 24 in the manner described above until display controller 16 retrieves an index value from display list memory 14. Upon retrieving the index value, display list controller 16 sends the index value to a first-in-first-out (FIFO) register, or FIFO indexer 38 over a bus 35. FIFO indexer 38 then supplies the index value to an address control port 40 of cache memory device 28. Control block 36 then sends a signal to cache memory device 28 and device 28 subsequently uses the received index value at address control port 40 to address the previously stored world space coordinates corresponding to the index value of the shared vertex and places the world space coordinates on a cache memory device data bus 37. Control block 36 then outputs a signal to output register 34 of I/O buffer 30 which in turn transfers the world space values from the cache data bus to system bus 31 for access by backend processor 24. Backend processor 24 performs clip testing, perspective divide, mapping, scan line conversion and pixel rendering for generating a graphics image on graphics display device 20. Thereafter, display controller 16 sequences to the next display list memory location and repeats the process described above.

As a result of the eliminated redundant transformation steps, the system of the invention reduces the processing time required to generate out-the-window simulation. For example, the time required to perform the index lookup is approximately four cycles. In comparison, the time required to perform the transformation process is approximately 20 cycles. Thus, the system of the invention provides a 5 to 1 performance improvement over previous graphics systems for each shared vertex associated with the polygonal forms to be displayed.

In summary, the system of the invention adds cache storage means and related control hardware to a pipeline graphics display system to reduce or eliminate the redundant matrix transformation of shared vertex data, thereby reducing the processing time required to generate the graphics images displayed for out-the-window simulation.

Although the invention has been described with reference to preferred embodiments, workers skilled in the art will recognize that changes may be made in form and detail without departing from the spirit and scope of the invention.

We claim:

1. An apparatus for reducing redundant matrix transformation of shared polygonal vertex data in a computer graphics system, comprising:

means for transforming original vertex data into world space data;

means for storing said world space data;

means for identifying a shared vertex; and means for retrieving stored world space data corresponding to said shared vertex and supplying the retrieved world space data corresponding to said shared vertex to a display means when said shared vertex is identified.

2. The apparatus of claim 1 wherein said means for identifying a shared vertex generates an index value for each shared vertex corresponding to a location where said world space data are stored.

3. The apparatus of claim 1 wherein said means for transforming vertex data comprises means for performing a matrix transformation of said vertex data into world space data.

4. The apparatus of claim 3 wherein said vertex data comprises X, Y, and Z vertex coordinates.

5. The apparatus of claim 1 wherein said means for storing said world space data comprises cache storage means.

6. The apparatus of claim 5 wherein said cache storage means comprises:

a cache memory device for storing said world space data;

control means coupled to said cache memory device for retrieving said world space data stored in said memory cache device and transferring said world space data to bus means; and buffer means having an input port for latching world space data received from said bus means and having an output port for transferring said world space data to to said display means.

7. The apparatus of claim 6 wherein said control means further comprises:

index means for receiving an index value from a first memory means and for supplying said index value to an address port of said cache memory device; and control block means for controlling said index means, said cache memory device, and said buffer means.

8. The apparatus of claim 1 wherein said vertex data comprises vertex coordinates.

9. The apparatus of claim 8 wherein said world space data comprises world space coordinates corresponding to said vertex coordinates.

10. An apparatus for improving the performance of a computer graphics system displaying polygonal forms, comprising:

processing means for generating vertex data associated with a polygon, assigning an index value to a vertex shared by a plurality of polygons, and storing said vertex data and said index value in a first memory device;

display list control means for sequentially retrieving said vertex data and said index values from said first memory device;

transformation means for converting said vertex data into world space data;

cache storage means for storing said world space data in a second memory device, for retrieving world space data corresponding to said shared vertex from said second memory device each time an index value stored in said first memory device is retrieved by said display list control means and for transferring said world space data retrieved from said second memory device to a display means.

11. The apparatus of claim 10 wherein said cache storage means comprises:

a cache memory device for storing said world space data;

control means coupled to said cache memory device for retrieving said world space data stored in said cache memory device and transferring said world space data to an internal bus; and buffer means having an input port for receiving world space coordinates from said internal bus and having an output port for transferring said world space data to said display means.

12. The apparatus of claim 11 wherein said control means further comprises:

index means for receiving said index value from said first memory means and for supplying said index value to an address port of said cache memory device; and control block means for controlling said index means, said cache memory device, and said buffer means.

13. The apparatus of claim 10 wherein said vertex data comprises X, Y, and Z vertex coordinates.

14. The apparatus of claim 13 wherein said transformation processor performs a matrix multiplication of said vertex coordinates to generate world space coordinates.

15. A method for reducing redundant matrix transformation of polygonal vertex data in a computer graphics system, comprising:

transforming vertex data into world space data;

storing said world space data;

identifying a shared vertex that has been transformed into stored world space data;

retrieving the previously stored world space data corresponding to said shared vertex when said shared vertex is identified; and supplying said retrieved world space data corresponding to said shared vertex to a display means.

16. The method of claim 15 wherein the step of storing said world space data comprises storing world space data in a cache memory device.

17. The method of claim 16 wherein said step of identifying a shared vertex further comprises the steps of:

receiving an index value from a first memory means; and supplying said index value to an address port of said cache memory device.

18. The method of claim 17 wherein the step of retrieving world space data further comprises the steps of:

retrieving said world space data stored in said cache memory device and transferring said world space data to bus means;

latching world space data received from said bus means.

19. A method for improving the performance of a computer graphics system displaying polygonal forms, comprising the steps of:

generating vertex data associated with a polygon;

assigning an index value to a shared vertex with previously generated vertex data;

storing said vertex data and said index value in a first memory device;

sequentially retrieving said vertex data and said index values from said first memory device;

converting said vertex data into world space data;

storing said world space data in a second memory device;

retrieving world space data corresponding to said shared vertex from said second memory device each time an index value stored in said first memory device is retrieved by a display list control means; and transferring said world space data retrieved from said second memory device to a display means.

20. The method of claim 19 wherein said vertex data are stored as X, Y, and Z vertex coordinates.

21. The method of claim 20 wherein the step of converting said vertex data comprises performing a matrix multiplication of said vertex coordinates to generate world space coordinates.

22. The method of claim 19 wherein said second memory device comprises a cache memory device.

* * * * *